US008466395B2

(12) United States Patent
Weiss et al.

(10) Patent No.: US 8,466,395 B2
(45) Date of Patent: *Jun. 18, 2013

(54) INDUCTION HEAT TREATMENT OF WORKPIECES

(75) Inventors: Kuno Weiss, Esslingen (DE); Oleg S. Fishman, Maple Glen, PA (US)

(73) Assignee: Inductotherm Corp., Rancocas, NJ (US)

( * ) Notice: Subject to any disclaimer, the term of this patent is extended or adjusted under 35 U.S.C. 154(b) by 176 days.

This patent is subject to a terminal disclaimer.

(21) Appl. No.: 12/852,977

(22) Filed: Aug. 9, 2010

(65) Prior Publication Data

US 2010/0301038 A1  Dec. 2, 2010

Related U.S. Application Data

(60) Division of application No. 11/760,772, filed on Jun. 10, 2007, now Pat. No. 7,772,530, and a continuation-in-part of application No. 11/261,097, filed on Oct. 28, 2005, now Pat. No. 7,291,817.

(60) Provisional application No. 60/623,413, filed on Oct. 30, 2004.

(51) Int. Cl.
*H05B 6/06* (2006.01)
(52) U.S. Cl.
USPC .......................... 219/663; 373/147; 373/152
(58) Field of Classification Search
USPC .............. 219/661–669; 373/7, 147, 148, 149, 373/150, 152
See application file for complete search history.

(56) References Cited

U.S. PATENT DOCUMENTS

| 4,147,910 | A | * | 4/1979 | Kiuchi et al. | 219/625 |
| 4,241,250 | A | * | 12/1980 | Steigerwald | 219/620 |
| 4,307,276 | A | | 12/1981 | Kurata et al. | |
| 6,222,167 | B1 | * | 4/2001 | Wada et al. | 219/645 |
| 6,608,291 | B1 | * | 8/2003 | Collins et al. | 219/662 |
| 6,696,770 | B2 | * | 2/2004 | Nadot et al. | 307/17 |
| 7,087,870 | B1 | * | 8/2006 | Fishman | 219/661 |
| 7,291,817 | B2 | * | 11/2007 | Weiss et al. | 219/653 |
| 2003/0111461 | A1 | * | 6/2003 | Morrison | 219/661 |
| 2007/0047612 | A1 | | 3/2007 | Keough | |

FOREIGN PATENT DOCUMENTS

| EP | 1729542 A2 | 12/2006 |
| JP | 05-326128 A | 12/1993 |
| JP | 2004-292853 A | 10/2004 |
| JP | 2003-217805 A | 7/2007 |
| JP | 2008-519401 A | 6/2008 |
| WO | 2006050089 A2 | 5/2006 |

* cited by examiner

*Primary Examiner* — William F Kraig
(74) *Attorney, Agent, or Firm* — Philip O. Post

(57) ABSTRACT

An apparatus and process are provided for induction heating of a workpiece. The workpiece is moved through an inductor to inductively heat treat the workpiece with electric power of varying frequency and duty cycle or amplitude control to control the magnitude of electric power as the frequency changes. Alternatively the workpiece may be stationary and the inductor can be moved along the workpiece, or combined and coordinated movement of both the workpiece and inductor can be used.

10 Claims, 11 Drawing Sheets

INDUCTION HEAT TREATMENT OF WORKPIECES

CROSS REFERENCE TO RELATED APPLICATIONS

This is a divisional application of pending U.S. application Ser. No. 11/760,772, filed Jun. 10, 2007, which is a continuation-in-part of U.S. application Ser. No. 11/261,097, filed Oct. 28, 2005, which claims priority to provisional patent application no. 60/623,413, filed Oct. 30, 2004, the entirety of each of which applications are incorporated herein by reference.

FIELD OF THE INVENTION

The present invention relates to induction heat treatment of continuous or discrete workpieces wherein pulse width modulation control or amplitude control is used to control induction heat treatment of the workpieces.

BACKGROUND OF THE INVENTION

Elongated workpieces, such as a drive shaft, require heat treatment of selected features on the workpiece. For example, a first feature, such as a pinion gear, may be provided at one end of a drive shaft, and a second feature, such as a universal coupling may be provided at the other end. The gear and coupling are of different physical configurations and require different heat treatment patterns for metallurgical hardening of these components. Additionally a heat-treated feature may need to be tempered after heat treating to relieve metallurgical stresses in the material of the feature.

One method of heat treating the workpiece and features on the workpiece is by electric induction scanning (or progressive) heat treatment. In this process, the workpiece generally moves through one or more scan inductors, although in other arrangements, the workpiece may be stationery and the one or more scan inductors (coils) may move along the length of the workpiece. AC power is applied to the scan inductor to create a magnetic field around the inductor. The field magnetically couples with the workpiece to inductively heat the workpiece. AC power to the scan inductor may be varied as the workpiece passes through the inductor. For example U.S. Pat. No. 3,743,808 teaches controlling the induction power and/or the scanning velocity of the scan inductor by comparing instantaneous power and the instantaneous velocity with a known energy distribution profile. The rate at which the workpiece moves through the inductor (scan rate) can be used to control the degree of heating at the cross section of the workpiece that is coupled with the magnetic field.

Induction heat depth of penetration (induced current depth of penetration, δ) of a workpiece can be calculated from the formula:

$$\delta = 503\sqrt{\frac{\rho}{\mu F}}$$

where δ is in meters; ρ is the electrical resistivity of the workpiece in ohm-meters; μ is the relative magnetic permeability of the workpiece; and F is the frequency of the supplied induction power in Hertz. Therefore depth of penetration is inversely proportional to the square root of the frequency of the applied current. If the workpiece has two features with a first feature that requires heating to a shallow depth of penetration (e.g. 2.5 mm), and a second feature that requires heating to a deeper depth of penetration (e.g. 4.5 mm), the conventional method uses an inverter with a fixed output frequency, for example 10,000 Hertz, to achieve the shallower depth of penetration. From the above equation, the inverter's output frequency should be lower than 10,000 Hz for the deeper depth of penetration of the second feature of the workpiece, but since the frequency is fixed, the induction heat scan of the second feature must be slowed down to allow for deeper heat penetration by heat conduction into the second feature. Further because of the slower scan rate, inverter output power to the induction coil must be reduced to avoid overheating of the surface of the second feature. Also a heat-treated feature may require tempering of the heat-treated feature to reduce stresses in the feature. Typically the feature is first heat treated in a first scan with low power and fixed high frequency to heat treat to the required depth of penetration, and then heated in a second scan with fixed low frequency to temper the feature.

One object of the present invention is to vary the output frequency of the inverter while adjusting the output power level of the inverter by pulse width modulation, as required to inductively heat treat and/or temper various features of a workpiece to different depths of penetration in an induction scan of the workpiece.

Another object of the present invention is to control the output frequency of the power source to achieve optimal induction heating by control of the depth of penetration.

Another object of the present invention is to vary the output frequency of the inverter while adjusting the output power level of the inverter by pulse width modulation or amplitude control, as required to inductively heat treat and/or temper a workpiece to varying degrees.

BRIEF SUMMARY OF THE INVENTION

In one aspect the present invention is a method of induction heating one or more multiple features of a workpiece. Electric power is supplied to an inductor to generate an ac magnetic field around the inductor. Each of one or more multiple features of the workpiece are sequentially positioned in the vicinity of the magnetic field to magnetically couple the positioned feature to the magnetic field whereby the positioned feature is inductively heat treated and the impedance of the supplied electric power is matched with the impedance of the workpiece. The frequency of the electric power is selectively varied while each one of the one or more multiple features of the workpiece are sequentially positioned in the vicinity of the magnetic field and the magnitude of the electric power is selectively varied by changing the duty cycle of the electric power while each one of the multiple features of the workpiece are sequentially positioned in the vicinity of the magnetic field and the frequency of the electric power is adjusted.

In another aspect the present invention is an apparatus for induction heat treatment of a continuous or discrete workpiece. A power source has an ac output with pulse width modulation control and an inductor is connected to the ac output to generate an ac magnetic field. Means are provided for moving the continuous or discrete workpiece through the inductor to magnetically couple progressive cross sections of the continuous or discrete workpiece with the magnetic field. Means are also provided for selectively adjusting the frequency of the ac output when each one of the progressive cross sections is coupled with the magnetic field for induction heat treatment responsive to a parametric change in each one of the progressive cross sections, and for selectively adjusting the power of the ac output by changing the duty cycle of the ac output when each one of the progressive cross sections is coupled with the magnetic field for induction heat treatment and the frequency of the ac output is adjusted responsive to a parametric change in each one of the progressive cross sections.

In another aspect the present invention is a method of induction heat treatment of a continuous or discrete workpiece. Electric power is supplied to at least one inductor to generate an ac magnetic field around the at least one inductor. The workpiece is moved through the inductor to magnetically couple with progressive cross sections of the workpiece and subject the progressive cross sections to a heat treatment. The frequency of the electric power is selectively varied while each one of the progressive cross sections are sequentially positioned in the vicinity of the magnetic field, and the magnitude of the electric power is selectively varied by changing the duty cycle of the electric power while each one of the progressive cross sections of the workpiece are sequentially positioned in the vicinity of the magnetic field and the frequency of the electric power is adjusted.

In another aspect the present invention is an apparatus for induction heat treatment of a continuous or discrete workpiece. An inverter has a dc input and an ac output with an inductor connected to the ac output to generate an ac magnetic field. Means are provided for moving the continuous or discrete workpiece through the inductor to magnetically couple progressive cross sections of the continuous or discrete workpiece with the magnetic field. Means are also provided for selectively adjusting the frequency of the ac output when each one of the progressive cross sections is coupled with the magnetic field for induction heat treatment responsive to a parametric change in each one of the progressive cross sections, and means are also provided for selectively adjusting the power of the ac output by changing the amplitude to the dc input of the inverter when each one of the progressive cross sections is coupled with the magnetic field for induction heat treatment and the frequency of the ac output is adjusted responsive to a parametric change in each one of the progressive cross sections.

In another aspect, the present invention is an apparatus for, and method of, supplying ac power with varying frequency and duty cycle or amplitude control to an induction coil based upon the heating requirements of the cross section of a workpiece moving through the coil.

Other aspects of the invention are set forth in this specification and the appended claims.

BRIEF DESCRIPTION OF THE DRAWINGS

The foregoing brief summary, as well as the following detailed description of the invention, is better understood when read in conjunction with the appended drawings. For the purpose of illustrating the invention, there is shown in the drawings exemplary forms of the invention that are presently preferred; however, the invention is not limited to the specific arrangements and instrumentalities disclosed in the following appended drawings.

DETAILED DESCRIPTION OF THE INVENTION

Figure 1:
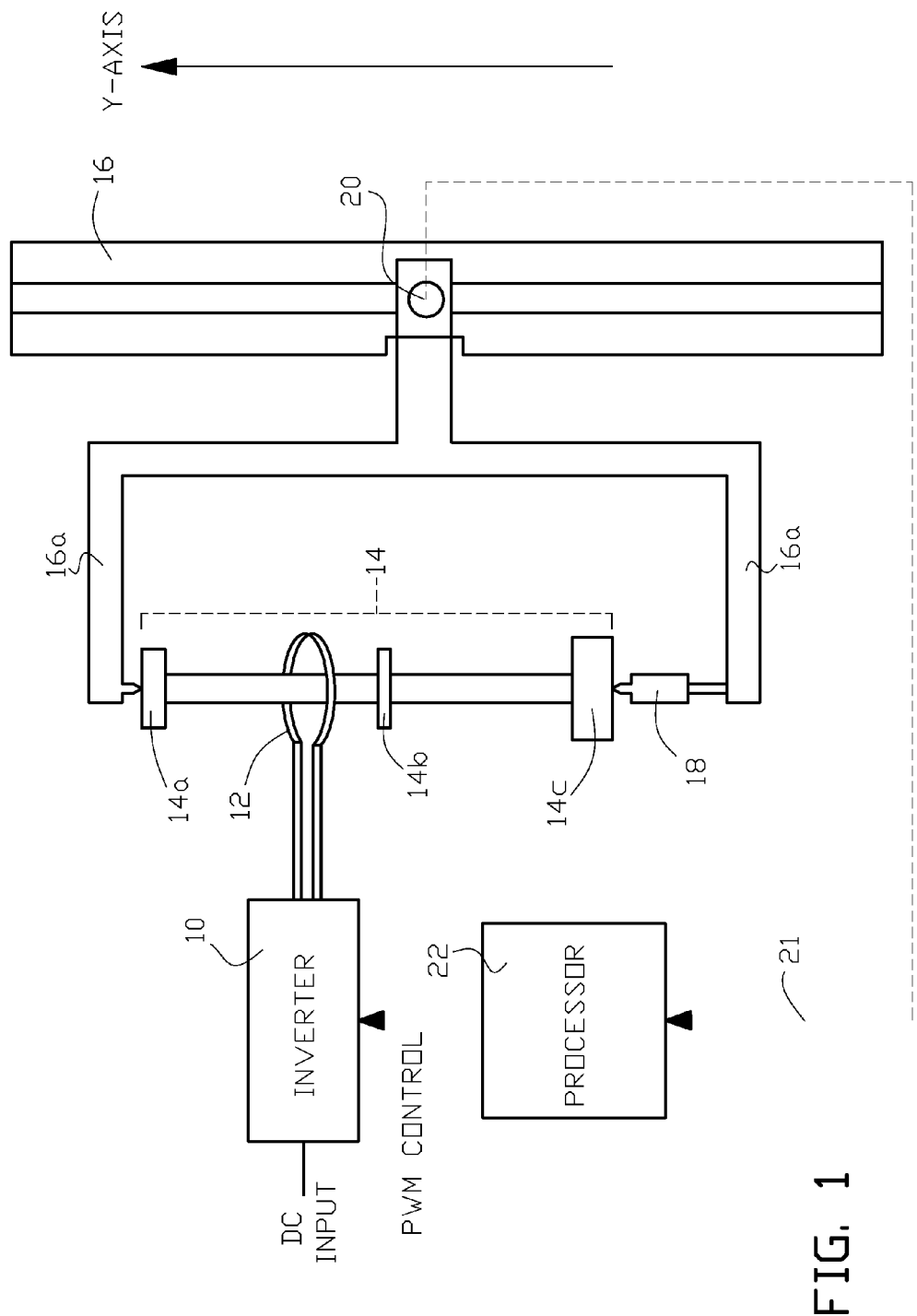
FIG. 1 is a simplified diagrammatic view of one example of the scan induction heating apparatus of the present invention.

There is shown in the figures one example of the scan induction heating apparatus of the present invention. In FIG. 1, inverter 10 supplies single phase ac power to scan inductor (coil) 12 via suitable electrical conductors such as bus bars. DC input to the inverter may be from any suitable dc power source. The inductor may comprise any type of inductor known in the art, and may be, for example, a single or multiple turn inductor, or an assembly of individual inductors that are connected to one or more ac sources of power. Workpiece 14 is held in place by a means for moving the workpiece through the inductor, which can be, for example, a screw drive assembly 16, with extended arms, 16a, to hold the ends of the workpiece. Alternatively the workpiece may be stationary and the inductor can be moved along the workpiece, or combined and coordinated movement of both the workpiece and inductor can be used. A means for rotating the workpiece, such as electric motor 18, may also be provided for rotating the workpiece as it moves through the inductor. A position sensing means, such as servomechanism 20, provides position output signal 21 to processor 22. The position output signal indicates the Y-axis position of the cross section of the workpiece that is within the inductor (i.e. the section of the workpiece that is effectively coupled with the magnetic field generated by the flow of current in the inductor).

Figure 2:
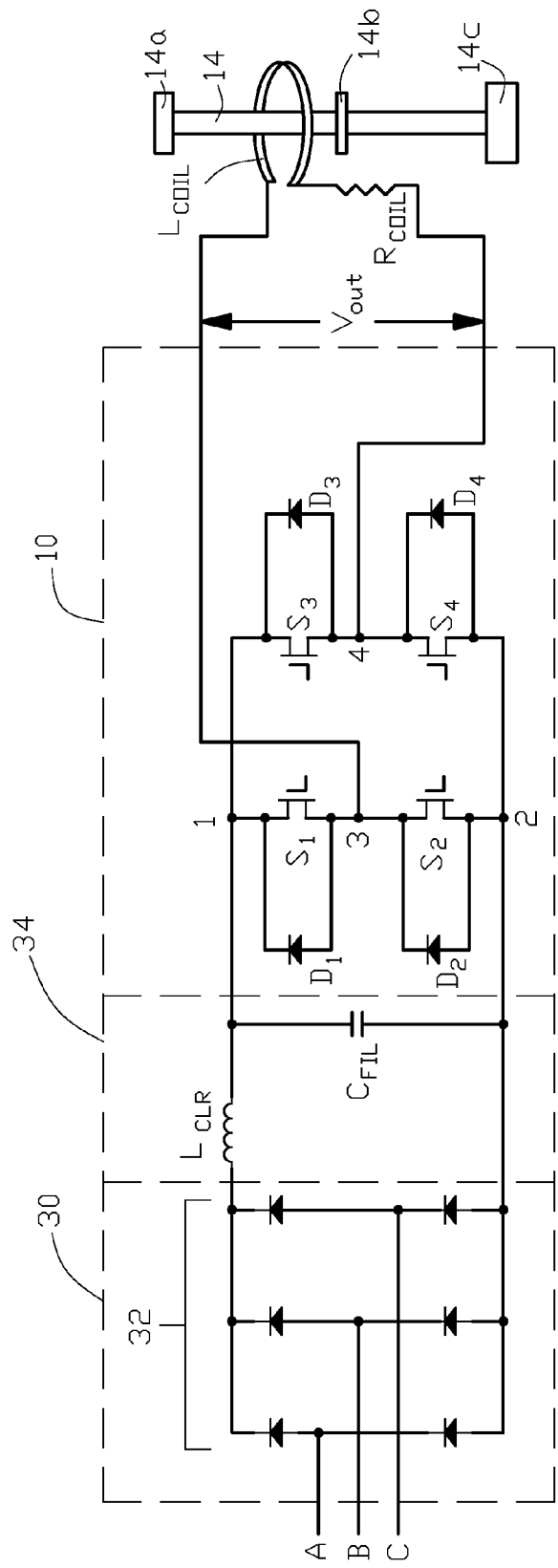
FIG. 2 is a simplified schematic of one example of a power supply and load circuit used with the scan induction heating apparatus of the present invention.
Figure 8:
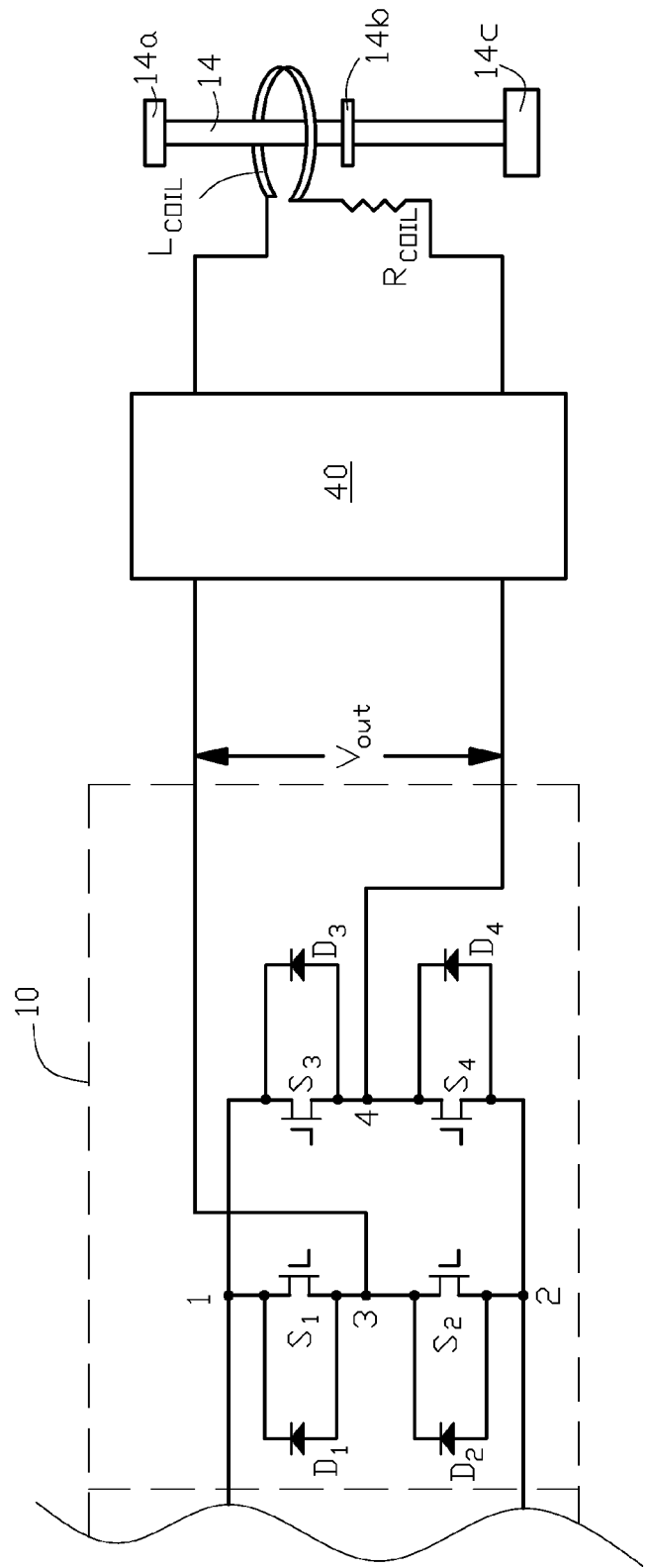
FIG. 8 is a partial simplified schematic of another example of a power supply and load circuit used with the induction heating apparatus of the present invention wherein an impedance matching device is used between the output of the inverter and the load circuit.

In some examples of the invention an impedance matching device 40 may be provided between the output of inverter 10 and the load circuit as illustrated in FIG. 8. DC input to the inverter may be as shown in FIG. 2 or any other suitable method. Active and/or passive circuit components may be used for the impedance matching device. By way of example, and not limitation, a fixed ratio transformer or autotransformer, or a transformer or autotransformer with multiple taps and a tap changing apparatus to provide additional flexibility in impedance matching between the output of the inverter and the load circuit may be used. Alternatively the impedance matching device may use active circuit components, or a combination of active and passive circuit components, to achieve dynamic impedance matching as the impedance of a load changes. For example one or more inverter output power parameters and/or load electrical parameters may be sensed and inputted to the dynamic impedance matching circuitry to make dynamic adjustments in impedance. Impedance matching device 40 may be used in combination with any other examples of the invention.

The workpiece can have one or more features, such as features 14a, 14b and 14c that may require different depths of current penetration of induction heating power for heat treatment and/or tempering as those features pass through the inductor. The regions of the workpiece between these features may or may not require heat treatment. The multiple features may be spaced apart as shown in FIG. 1 or located adjacent to each other.

Processor 22 processes the output signal from the position sensing means to determine the power level, frequency and time duration of induction heating to be achieved at the inputted position of the workpiece relative to the induction coil as further described below.

FIG. 2 is a simplified schematic of one example of an ac to dc power supply used with inverter 10 that illustrates one method of supplying dc power to the inverter. Rectifier section 30 comprises a full wave bridge rectifier 32 with ac power input on lines A, B and C supplied from a suitable source, such as utility power. Filter section 34 comprises current limiting reactor $L_{CLR}$ and dc filter capacitor $C_{FIL}$. Inverter section 10 comprises four switching devices, $S_1$, $S_2$, $S_3$ and $S_4$, and associated anti-parallel diodes $D_1$, $D_2$, $D_3$ and $D_4$, respectively. Each switching device can be any suitable solid state device, such as an insulated gate bipolar transistor (IGBT). The load circuit connected to the output of inverter 10 comprises scan inductor $L_{COIL}$ and workpiece 14, which has regions, or features, that are coupled with the magnetic field generated around the inductor when the workpiece or inductor are moved relative to each other. Resistance of the workpiece and the scan inductor ($R_{COIL}$) comprise the load resistance $R_{LOAD}$.

Figure 3A:
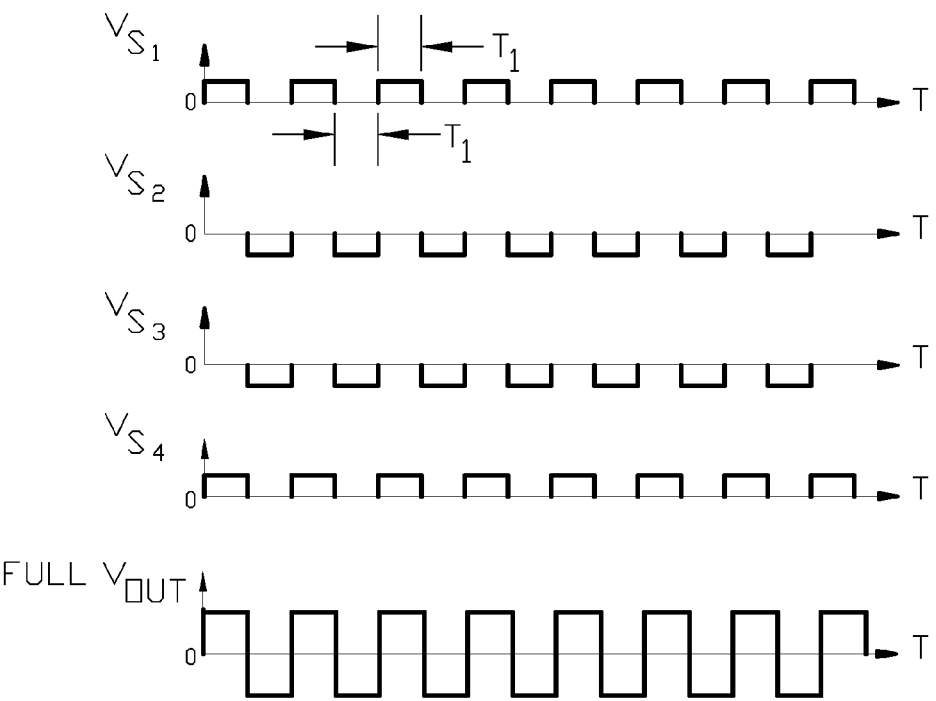
FIG. 3(a) and FIG. 3(b) illustrate the application of pulse width modulation to change the inverter's output from full power to half power.
Figure 3B:
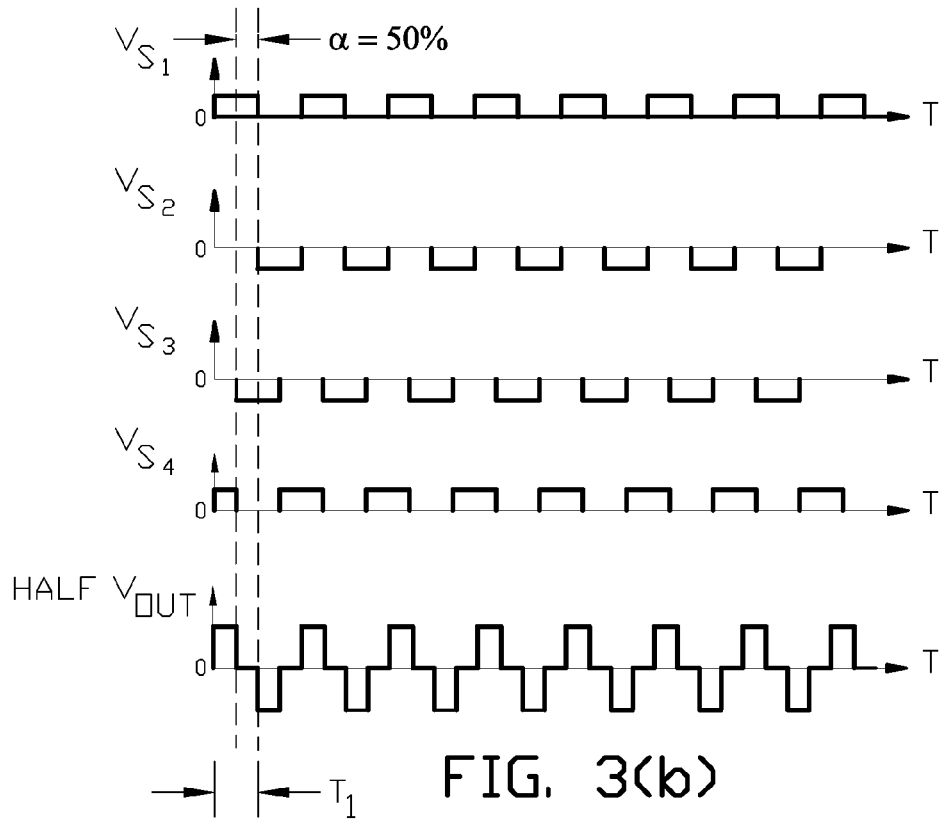

FIG. 3(a) illustrates the typical output voltage waveform (FULL $V_{OUT}$) of the bridge inverter shown in FIG. 2 with no modulation of the voltage pulse width. Inverter switches $S_1$ and $S_4$ conduct during a first time period, $T_1$, and inverter switches $S_2$ and $S_3$ conduct during a non-overlapping second time period, $T_1$, to produce the illustrated full output voltage waveform with a frequency equal to ½ $T_1$. FIG. 3(b) illustrates the typical output voltage waveform (HALF $V_{OUT}$) of the bridge inverter with 50 percent duty cycle (α). Each of the inverter switches continues to conduct for the same period of time, $T_1$, as in FIG. 3(a), but with the conduction periods for switches $S_3$ and $S_4$ advanced by half a time period (i.e., the duty cycle is equal to 50 percent) to produce the illustrated half of full output voltage. With this arrangement, the load is shorted every half period. Changing the duration of the overlapping conduction periods for switches $S_3$ and $S_4$ results in different values for the duty cycle. Since power is proportional to the square of the supplied voltage, the power applied to the inductor will also change as the duty cycle changes. In the present invention variable frequency control is achieved by changing the time period, $T_1$, while the magnitude of the voltage (power) is adjusted by changing the duty cycle.

The effects on the output characteristics of a power supply with varying output frequency that does not use the pulse width modulation control of the present invention is illustrated with a baseline load circuit for a particular workpiece. For an inverter having output power of 100,000 Watts ($P(f_0)$) at 635 volts ($V_{OUT}$), and frequency ($f_0$) of 10,000 Hertz, baseline load circuit characteristics are established as:

$L_0 = 30 \times 10^{-6}$ Henries inductance of the inverter load;
$R_0 = 0.4$ ohms resistance of the inverter load; and
$Q_0 = (2 \cdot \pi \cdot f_0 \cdot L_0)/R_0 = 4.712$ for the load circuit Q factor.

Baseline peak load current, $I_0$, can be calculated as 772.45 amperes from equation (1):

$$I_0 = \frac{V_{out}}{R_o} \cdot \left(1 - e^{\frac{-R_0}{2L_0 \cdot f_0}}\right).$$

Figure 4A:
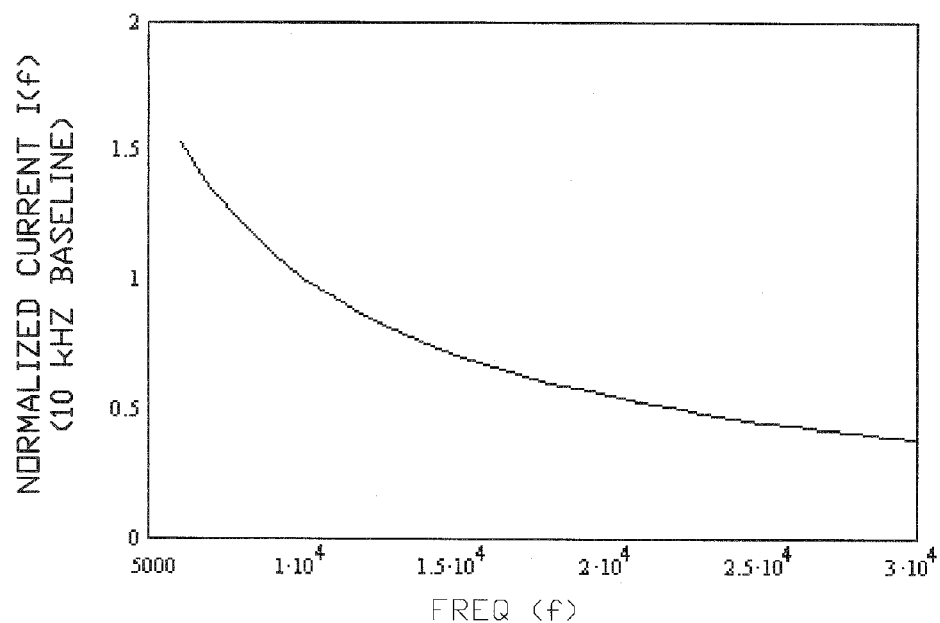
FIG. 4(a) illustrates the change in load current magnitude with a change in the frequency output of an inverter with no pulse width modulation.

FIG. 4(a) illustrates the decrease in inductor current, I(f), normalized to the baseline current, as the output frequency, f, of the inverter increases, which can be calculated from equation (2):

$$I(f) = \frac{V_{OUT}}{R_o \sqrt{\frac{f}{f_o}}} \cdot \left(1 - e^{\frac{-R_o}{2L_0 \sqrt{f \cdot f_o}}}\right).$$

Figure 4B:
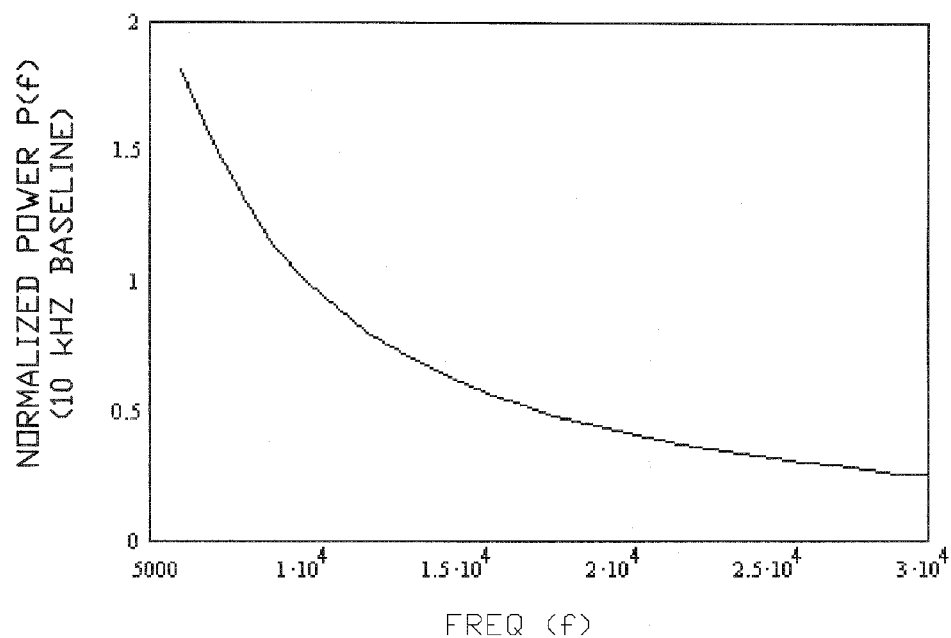
FIG. 4(b) illustrates the change in load power magnitude with a change in the frequency output of an inverter with no pulse width modulation.

FIG. 4(b) illustrates the decrease in induction heating power, P(f), normalized to the baseline power, as the output frequency, f, of the inverter increases, which can be calculated from equation (3):

$$P(f) = \frac{V_{OUT}^2}{2R_o \sqrt{\frac{f}{f_o}}} \cdot \left(1 - e^{\frac{-R_o}{2L_0 \sqrt{f \cdot f_o}}}\right)^2.$$

Figure 4C:
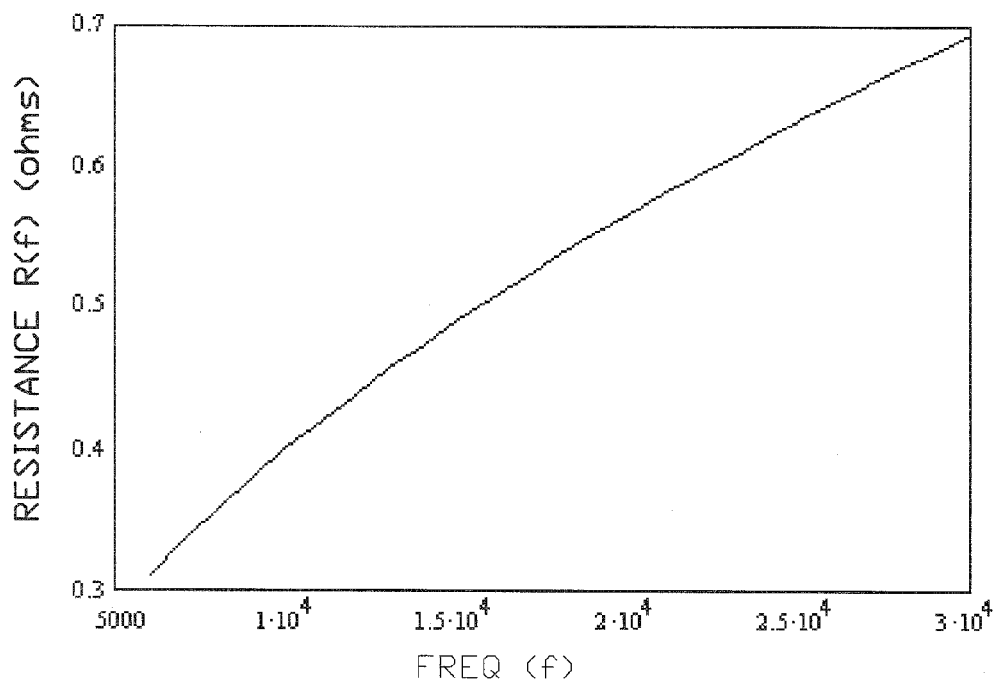
FIG. 4(c) illustrates the change in load resistance with a change in the frequency output of an inverter with no pulse width modulation.

FIG. 4(c) illustrates the increase in load resistance, R(f), as the output frequency, f, of the inverter increases, which can be calculated from equation (4):

$$R(f) = R_0 \cdot \sqrt{\frac{f}{f_o}}.$$

Figure 4D:
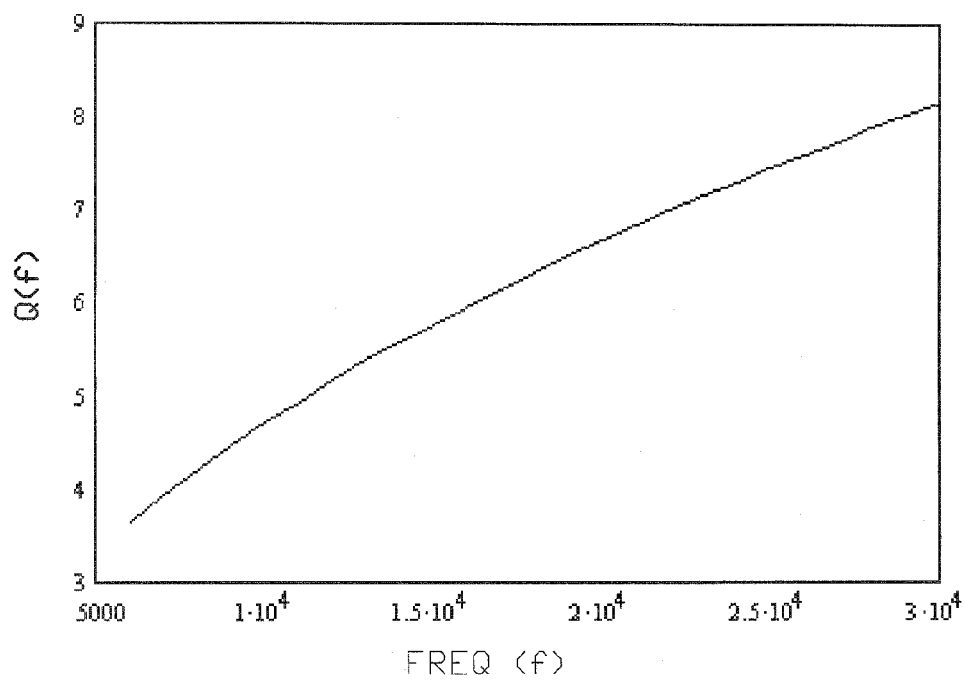
FIG. 4(d) illustrates the change in the Q factor of the load circuit with a change in the frequency output of an inverter with no pulse width modulation.

FIG. 4(d) illustrates the increase in the Q factor of the load circuit as the output frequency, f, of the inverter increases, which can be calculated from equation (5):

$$Q(f) = Q_0 \cdot \sqrt{\frac{f}{f_o}}.$$

Figure 5A:
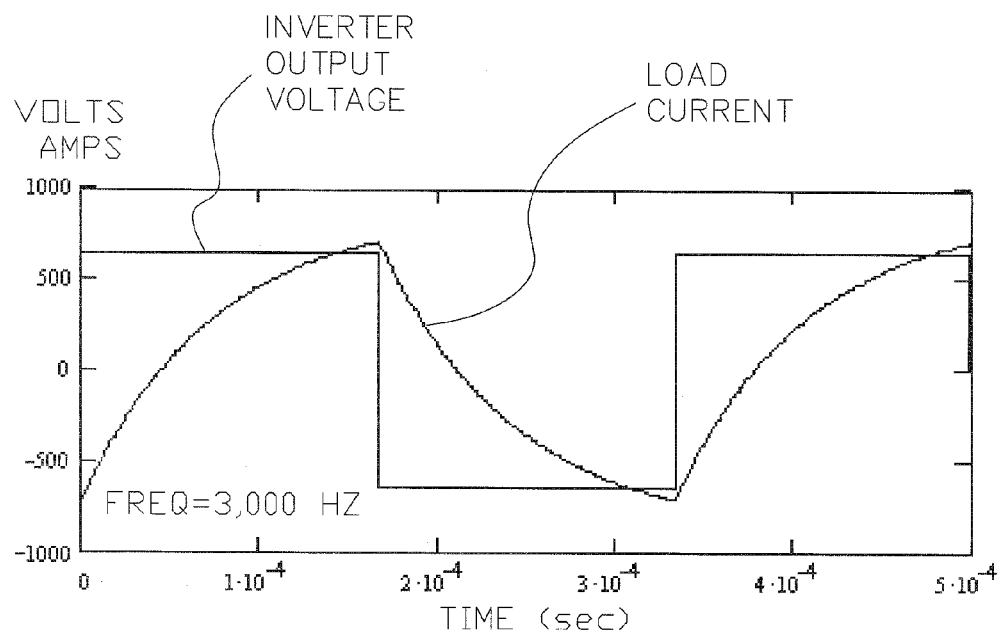
FIG. 5(a) illustrates the relationship between an inverter's output voltage and load current with an inverter output frequency of 3,000 Hertz and no pulse width modulation.
Figure 5B:
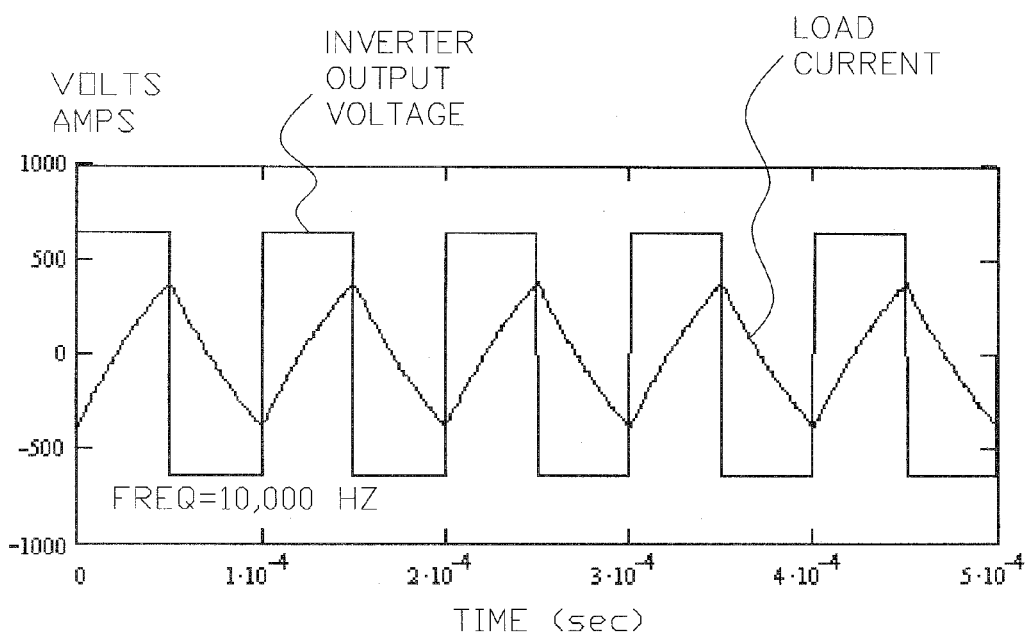
FIG. 5(b) illustrates the relationship between an inverter's output voltage and load current with an inverter output frequency of 10,000 Hertz and no pulse width modulation.
Figure 5C:
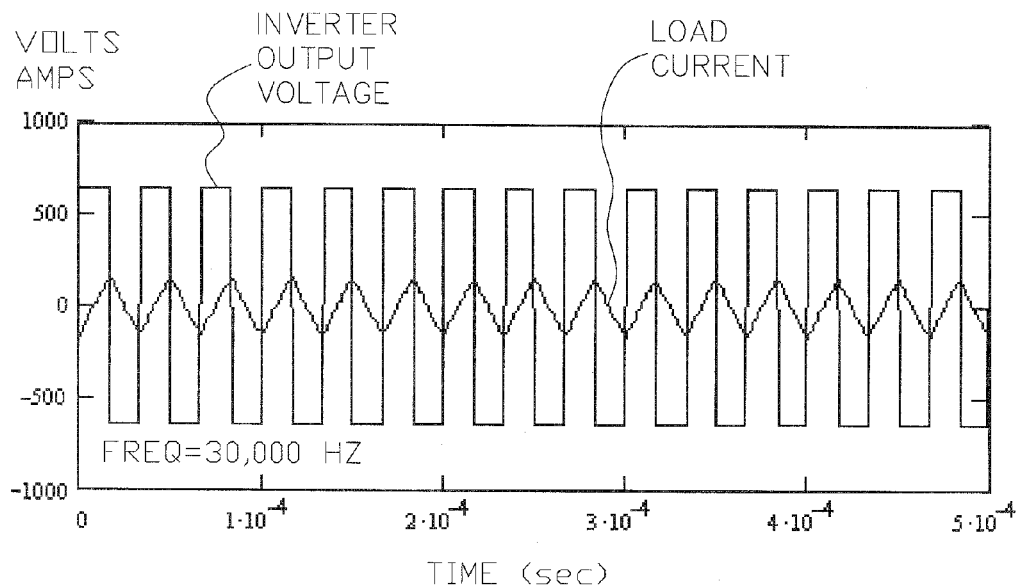
FIG. 5(c) illustrates the relationship between an inverter's output voltage and load current with an inverter output frequency of 30,000 Hertz and no pulse width modulation.

FIG. 5(a) through FIG. 5(c) illustrate the generalized relationships in FIG. 4(a) through FIG. 4(d) for a specific example wherein pulse width modulation control of the present invention is not used. FIG. 5(c) graphically represents voltage and current outputs of an inverter operating at rated full power and a frequency of 30,000 Hertz with no pulse width modulation control.

In FIG. 5(a) the output frequency of the inverter is lowered to 3,000 Hertz and the current (and power) output is relatively high without pulse width modulation control. In the present invention pulse width modulation control of the inverter's output can be used to reduce the power output of the inverter by using a relatively large duty cycle.

In FIG. 5(b) the output frequency of the inverter is at 10,000 Hertz and the power output is lower than the power output at 3,000 Hertz without pulse width modulation control, but still greater than the rated full power (current) of the inverter shown in FIG. 5(c). In the present invention pulse width modulation control of the inverter's output can be used with a lower duty cycle than that used at 3,000 Hertz to keep the power output of the inverter at or below rated value.

In general, in the present invention, pulse width modulation control is used to change the inverter's output power at any operating frequency from that which would occur without pulse width modulation control. In general duty cycle is decreased as frequency decreases to reduce the inverter's output power, and duty cycle is increased as frequency increases to increase the inverter's output power.

FIG. (6) further illustrates the characteristics of the load current with pulse width modulation control. When there is a non-zero inverter output voltage, the load current, $I_{LOAD}$, can be calculated from equation (6):

$$I_{LOAD} = \frac{V_{OUT}}{R_{LOAD}}\left(1 - e^{\frac{R_{LOAD}}{L_{LOAD}} \cdot t}\right).$$

When there is zero inverter output voltage, the load current can be calculated from equation (7):

$$I_{LOAD} = I_{INITIAL} \cdot e^{-\frac{R_{LOAD}}{L_{LOAD}} \cdot t}$$

where $I_{INITIAL}$ is the magnitude of current when the inverter output voltage transitions to zero.

Figure 6:
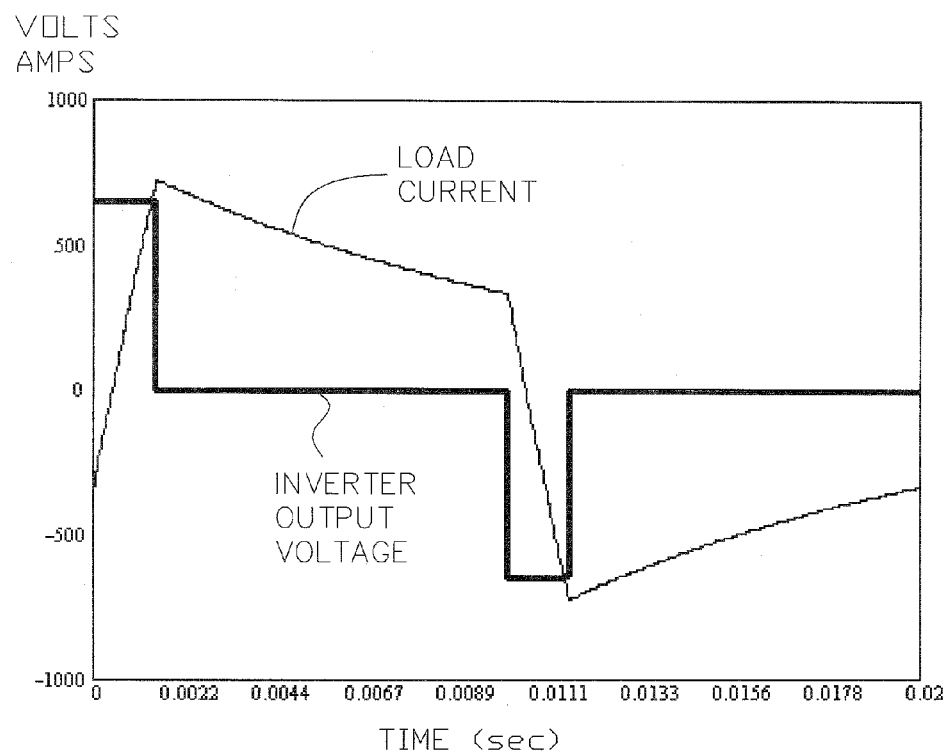
FIG. 6 illustrates the relationship between an inverter's output voltage and load current for an inverter using pulse width modulation in one example of the present invention.

From FIG. 6, the shorter the duty cycle, the smaller the peak value of the load current (and power) before the load current drops when the output voltage is zero. Conversely the longer the duty cycle, the larger the peak value of the load current (and power) before the load current drops when the output voltage is zero.

Figure 7:
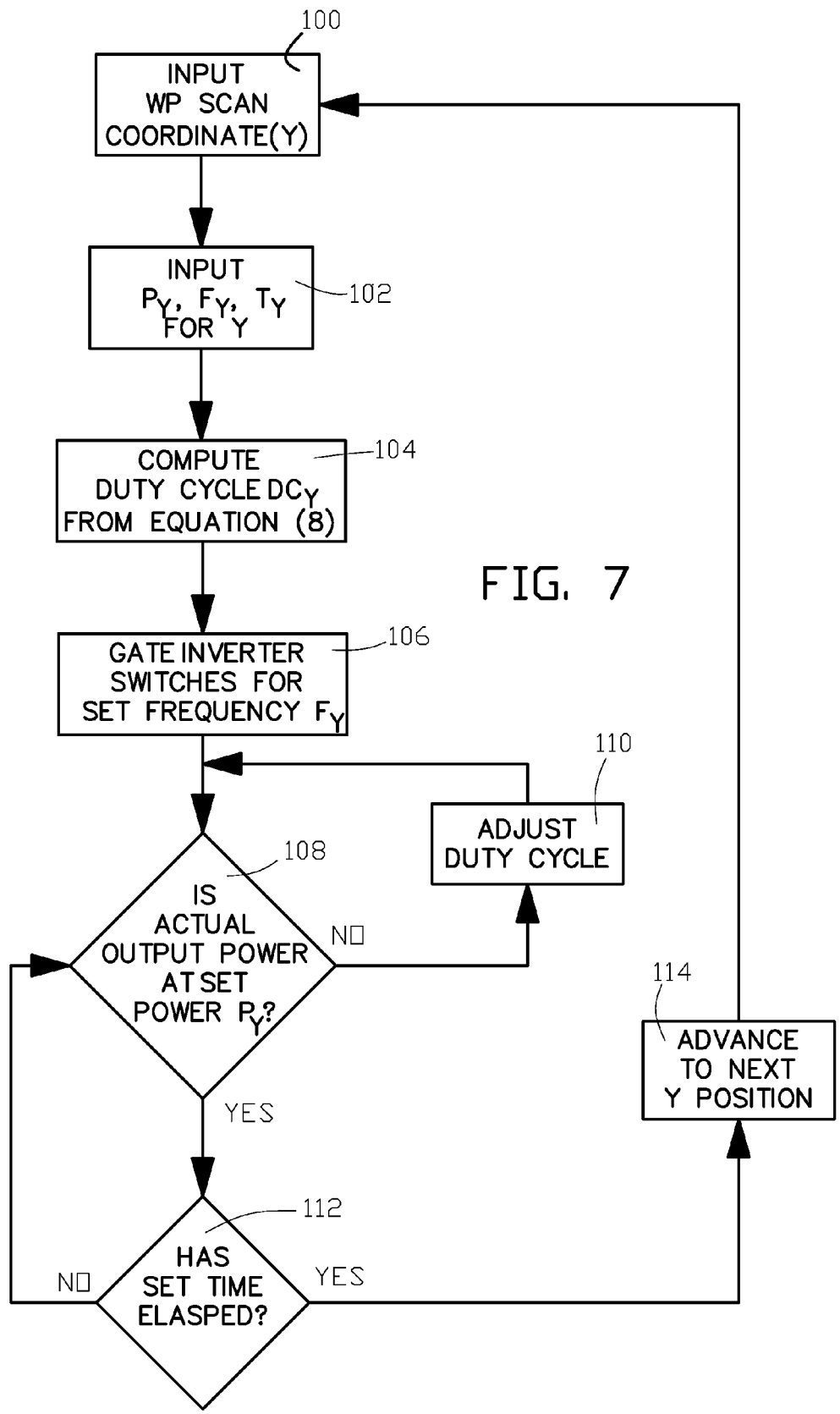
FIG. 7 is a simplified flow chart illustrating one example of the induction power control scheme of the present invention for controlling scan induction power as the output frequency of the inverter is changed during the scan.

FIG. 7 illustrates a simplified flowchart for one non-limiting example of the scan induction heating process of the present invention. The routines identified in the flowchart can be implemented in computer software that can be executed with suitable hardware. Routine 100 inputs a workpiece (WP) scan coordinate (Y) that represents the position of the workpiece within inductor 12. Routine 102 inputs values of power ($P_Y$), frequency ($F_Y$) and time ($T_Y$) for induction heating at position Y. These values may be previously stored in a memory device, for example, as a lookup table based upon values established by experimental testing of the workpiece with the apparatus. Alternatively an operator of the scan induction apparatus may manually input these values, or another method may be used to determine the required frequency, power level, and, if used, the variable time value for induction heat treatment of each position of the workpiece.

Routine 104 computes the required duty cycle ($DC_Y$) for the inverter output from equation (8):

$$\text{Duty Cycle(in percent)} = [P_Y/P(F_Y)] \times 100,$$

where $P(F_Y)$ is calculated from equation (3) with an appropriate baseline load circuit determined from the actual workpiece being induction heat treated.

Routine 106 controls switching of the power supply's switching devices to achieve the desired output frequency and duty cycle. In this non-limiting example, routine 106 outputs gate inverter control signals to the gating circuits for the inverter's switches to achieve the required frequency, $F_Y$, and duty cycle, $DC_Y$. Routine 108 determines whether actual measured output power is at set power $P_Y$. Actual measured output power may be inputted by use of suitable sensing devices. If actual measured power is not equal to the required set power, then the duty cycle is appropriately adjusted in routine 110, and routine 108 repeats. If actual measured power is equal to the required set power, then routine 112 checks to see if set time $T_Y$ has expired. If the set time has not expired, then routine 108 is repeated; if set time has expired, then routine 114 outputs a control signal to the workpiece's positioning system to advance the workpiece to the next incremental position for induction heat treatment and returns to routine 100 for execution. In other examples of the invention the time for induction heating at each position Y will be the same for all positions of the workpiece within the inductor; for this arrangement, frequency control and duty cycle control, as frequency changes, are used to induction heat each position of the inductor as each position is stepped through the inductor at a constant rate of speed.

In other examples of the invention, movement and positioning of the workpiece through the inductor may be predetermined, for example, where an induction scan apparatus sequentially heat treats many identical workpieces. In these arrangements, power, frequency, time, and duty cycle settings at each position of the workpiece may be predetermined by experimental testing with the workpiece and the induction scan apparatus of the present invention, and executed without further inputting or computing any or all of these values for each successive identical workpiece heat treated with the apparatus. Incremental or sequential positioning of parts or features of the workpiece in the inductor can be accomplished as discrete stepped movement of the workpiece or inductor, or a combination of both, either as fine, minute steps that approach continuous movement of the workpiece or inductor, or coarser steps visually discernable as stepped movement. While the terms "selected part," "multiple features," and "locations" are used to describe sections of the workpiece placed within the inductor for induction heat treatment with variable frequency and duty cycle, the present invention includes varying the frequency and/or duty cycle while the part, feature or location passes through the inductor. That is subsections of each part, feature or location may be heat treated with varying frequencies and duty cycles as the subsections of the part, feature or location pass through the inductor.

In other examples of the invention pulse width modulation control can be used to control the inverter's power output as the output frequency of the inverter varies at a given workpiece position, for example, to achieve heat treatment and tempering for a feature of the workpiece. Further sequential heat treatment of features comprising the workpiece is not limited to sequential heat treatment in the order that the features are positioned in the workpiece. For example, referring to workpiece 14 in FIG. 1, features 14a, 14b and 14c may be positioned and heat treated sequentially in that order through inductor 12. Alternatively, for example, features 14*a*, 14*c* and 14*b* may be positioned and heat treated sequentially in that order through the inductor.

In other examples of the invention pulse width modulation control can be used to control the inverter's power output as the frequency of the inverter varies, as disclosed herein, to optimize induction heating effects in various types of workpieces for various types of induction heat treatments, such as, but nor limited to, surface heat treatment, penetration heat treatment into variable depths of penetration of the workpiece up to complete core heating, or material application heat treatment, for example, to achieve bonding of a coating material applied to the surface of the workpiece by induction heating. The workpiece may be a continuous workpiece, for example a strip, wire or tubing of various dimensions, either hollow or solid, or discrete workpieces such as solid sections, tubular sections, rectangular or square blocks or any other shape requiring full or partial induction heating to achieve changes in the metallurgical structure or characteristics of the workpiece, or to allow application of materials to the original workpiece, for example, in coating, brazing or diffusing.

For example a continuous workpiece, such as but not limited to a wire can be continuously fed through one or more inductors that are connected to the output of an inverter, either directly or via an impedance matching device. Suitable apparatus can be provided for feeding the wire through the one or more inductors, such as but not limited to, a supply reel of wire on one side of the one or more inductors and a power driven take-up reel on the opposing side of the one or more inductors. The continuous wire can be represented as a continuous progression of cross sections of the continuous workpiece that pass through the one or more inductors while pulse width modulation control is used to control the inverter's power output as the frequency of the inverter varies to achieve the desired type of heat treatment for each of the progressive cross sections passing through the one or more inductors. Furthermore in other examples of the invention one or more parameters of the workpiece, such as, but not limited to, the cross sectional diameter of each progressive cross section of the wire can be dynamically sensed prior to being fed through the one or more inductors so that deviations from a nominal cross sectional diameter can be sensed and used in adjusting the pulse width modulation control and frequency as the cross sectional diameter deviates from nominal to achieve a desired induction heat treatment in the progressive cross sections. By this method, for example, uniform induction heated surface temperature can be maintained even while the diameter of the progressive cross sections of the workpiece deviate from a nominal value. Sensing of the cross sectional diameter of the progressive cross sections may be accomplished, for example, by a laser sighting array suitably positioned around the wire. Cross sectional diameter is representative of one parametric change of the workpiece that may be sensed for adjustment of the pulse width modulation control and frequency of the present invention. Further the speed at which the wire is moving through the one or more inductors may be varied to adjust the period of time that each one of the progressive cross sections is coupled with the magnetic field generated by current flow through the one or more inductors to achieve the desired induction heat treatment of each one or the progressive cross sections. In other examples of the invention the one or more induction coils may also move along the length of the workpiece, either alone or in combination with movement of the workpiece.

For discrete workpieces a series of discrete workpieces may be fed through the one or more induction coils by suitable conveying apparatus while heat treatment of each progressive cross section of each discrete workpiece is achieved in a manner similar to the heat treatment of continuous workpieces as described above. In some applications a discrete workpiece may be individually fed through the one or more induction coils, or the workpiece may be held stationary and the one or more coils may be moved along the length of the workpiece, or a coordinated movement of both the workpiece and one more induction coils may be used.

In other examples of the present invention, amplitude control, either alone or in combination with pulse width modulation control as described above, can be used to change the inverter's output power at any operating frequency from that which would occur without amplitude control either alone, or in combination with pulse width modulation control.

Figure 9:
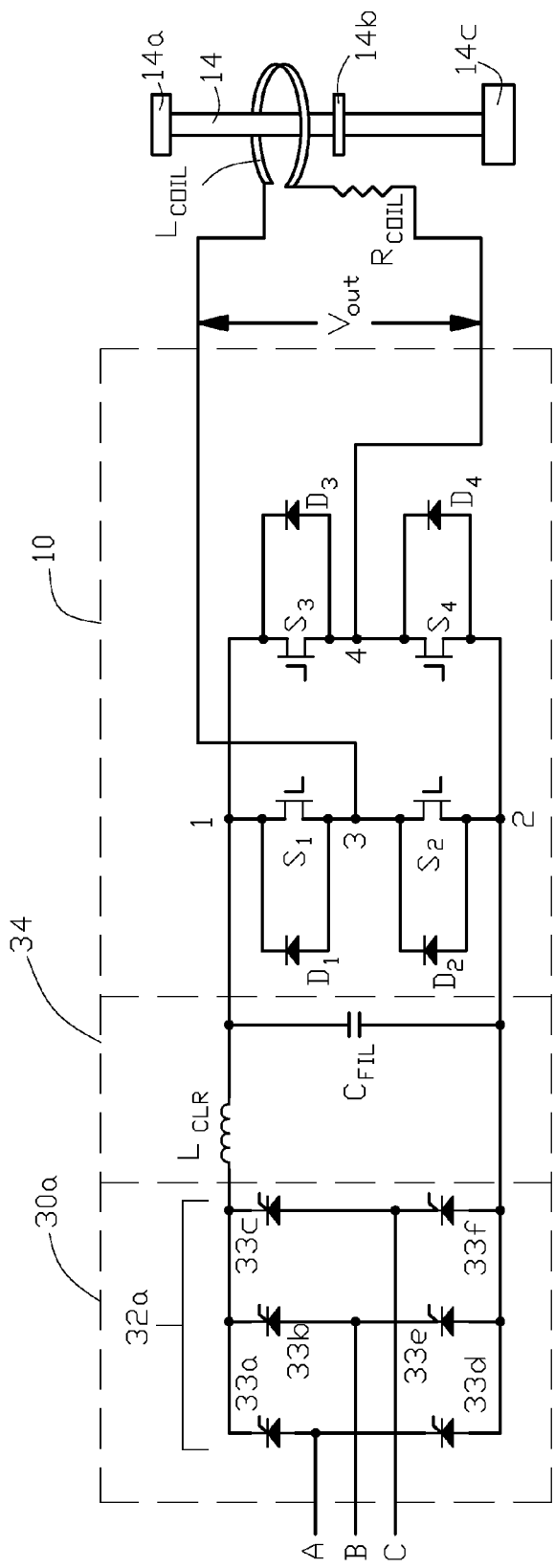
FIG. 9 is a simplified schematic of another example of a power supply and load circuit used with the induction heating apparatus of the present invention.

One method of achieving amplitude control is illustrated in the simplified schematic diagram shown in FIG. 9. Rectifier 32*a* may be composed of active switching elements 33*a*-33*f*, such as silicon controlled rectifiers, so that the amplitude of the dc output voltage of the rectifier (input to inverter 10) can be changed by control of the active switching elements to provide inverter output amplitude control in combination with variable frequency output from inverter 10.

Figure 10:
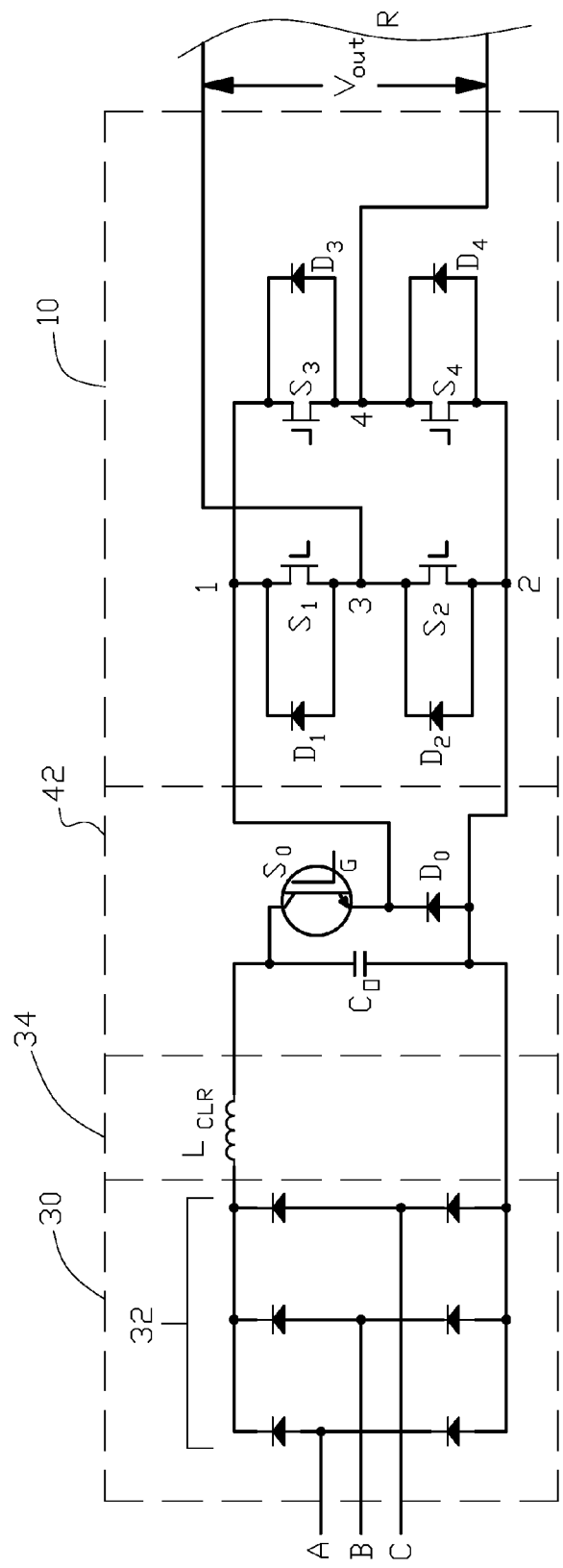
FIG. 10 is a simplified schematic of another example of a power supply and load circuit used with the induction heating apparatus of the present invention.

Alternatively a chopper regulator, represented by the non-limiting example chopper regulator circuit 42 in FIG. 10 may be used to provide regulated dc power to the input of inverter 10 to change the inverter's output power at any operating frequency from that which would occur without amplitude control.

Alternatively amplitude control can replace pulse width modulation control in any of the above examples of the invention.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

The invention claimed is:

1. A method of induction heating one or more multiple features of a workpiece comprising the steps of:

supplying electric power to at least one inductor to generate an ac magnetic field around the at least one inductor;

sequentially positioning each one of the one or more multiple features of the workpiece in the vicinity of the magnetic field to magnetically couple the positioned feature to the magnetic field whereby the positioned feature is inductively heat treated;

matching the impedance of the supply of electric power to the impedance of the workpiece;

selectively varying the frequency of the electric power while each one of the one or more multiple features of the workpiece are sequentially positioned in the vicinity of the magnetic field; and selectively varying the magnitude of the electric power by changing the duty cycle of the electric power while each one of the one or more multiple features of the workpiece are sequentially positioned in the vicinity of the magnetic field and the frequency of the electric power is adjusted.

2. Apparatus for induction heat treatment of a continuous or discrete workpiece, the apparatus comprising:
   a power source having an ac output with pulse width modulation control;
   an inductor connected to the ac output to generate an ac magnetic field;
   a means for moving the continuous or discrete workpiece through the inductor to magnetically couple progressive cross sections of the continuous or discrete workpiece with the magnetic field;
   a means for selectively adjusting the frequency of the ac output when each one of the progressive cross sections is coupled with the magnetic field for induction heat treatment responsive to a parametric change in each one of the progressive cross sections; and
   a means for selectively adjusting the power of the ac output by changing the duty cycle of the ac output when each one of the progressive cross sections is coupled with the magnetic field for induction heat treatment and the frequency of the ac output is adjusted responsive to a parametric change in each one of the progressive cross sections.

3. The apparatus of claim 2 further comprising a means for selectively adjusting the period of time that each one of the progressive cross sections is coupled with the magnetic field for induction heat treatment.

4. The apparatus of claim 2 wherein the parametric change comprises a change in the cross sectional diameter of the continuous or discrete workpiece.

5. The apparatus of claim 2 further comprising an impedance matching device connected between the ac output of the power source and the inductor.

6. A method of induction heat treatment of a continuous or discrete workpiece, comprising the steps of:
   supplying electric power to at least one inductor to generate an ac magnetic field around the at least one inductor;
   moving the workpiece through the inductor to magnetically couple with progressive cross sections of the workpiece and subject the progressive cross sections to a heat treatment;
   selectively varying the frequency of the electric power while each one of the progressive cross sections are sequentially positioned in the vicinity of the magnetic field; and
   selectively varying the magnitude of the electric power by changing the duty cycle of the electric power while each one of the one progressive cross sections of the workpiece are sequentially positioned in the vicinity of the magnetic field and the frequency of the electric power is adjusted.

7. The method of claim 6 further comprising the step of selectively varying the heat treatment time that each one of the one or more progressive cross sections is inductively coupled with the magnetic field.

8. The method of claim 6 wherein the heat treatment is surface heat treatment, cross sectional penetration heat treatment or bonding heat treatment.

9. The method of claim 6 further comprising the step of matching the impedance of the supply of electric power to the impedance of the workpiece.

10. Apparatus for induction heat treatment of a continuous or discrete workpiece, the apparatus comprising:
    an inverter having a dc input and an ac output;
    an inductor connected to the ac output to generate an ac magnetic field;
    a means for moving the continuous or discrete workpiece through the inductor to magnetically couple progressive cross sections of the continuous or discrete workpiece with the magnetic field;
    a means for selectively adjusting the frequency of the ac output when each one of the progressive cross sections is coupled with the magnetic field for induction heat treatment responsive to a parametric change in each one of the progressive cross sections; and
    a means for selectively adjusting the power of the ac output by changing the amplitude to the dc input of the inverter when each one of the progressive cross sections is coupled with the magnetic field for induction heat treatment and the frequency of the ac output is adjusted responsive to a parametric change in each one of the progressive cross sections.

* * * * *